(12) United States Patent
Mikš et al.

(10) Patent No.: US 6,714,361 B2
(45) Date of Patent: Mar. 30, 2004

(54) OPTICAL SYSTEM FOR DISTORTED IMAGING OF AN OBJECT

(76) Inventors: Antonín Mikš, Zdiměřická 1439, 140 00 Praha 4 (CS); Ivan Ondrašík, Fejfarova 914, 198 00 Praha 9 (CS)

( * ) Notice: Subject to any disclaimer, the term of this patent is extended or adjusted under 35 U.S.C. 154(b) by 0 days.

(21) Appl. No.: 10/392,350

(22) Filed: Mar. 19, 2003

(65) Prior Publication Data

US 2003/0189760 A1 Oct. 9, 2003

(30) Foreign Application Priority Data

Apr. 4, 2002 (CS) .................................. 2002-1190

(51) Int. Cl.⁷ .............................. B02B 27/10; B02B 3/02
(52) U.S. Cl. ..................... 359/708; 359/619; 359/625
(58) Field of Search ................................ 359/708, 619, 359/625, 626, 622, 637

(56) References Cited

U.S. PATENT DOCUMENTS 6,052,230 A  *  4/2000  Clark ......................... 359/626

* cited by examiner

Primary Examiner—Jordan M. Schwartz
Assistant Examiner—Tim Thompson
(74) Attorney, Agent, or Firm—Harrison & Egbert

(57) ABSTRACT

An optical system for distorted imaging of an object, especially for photographic cameras, is based on a distorting optical system (1) consisting of at least one lens where at least one of the lenses has at least one asymmetric aspherical optical surface and/or of at least one diffractive element, where at least one diffractive element has a surface with asymmetric diffractive structure and/or at least two lenses with mutual general space orientation. The following relations apply to the orthogonal co-ordinates (x, y, z) of any point of the object whose image is to be distorted, and the orthogonal co-ordinates (x', y', z') of the image of this point with the required distortion:

$$x' = \sum_{i=1}^{i=N} a_i f_i(x, y, z), \quad y' = \sum_{i=1}^{i=N} b_i g_i(x, y, z), \quad z' = \sum_{i=1}^{i=N} c_i h_i(x, y, z)$$

where $N \geq 1$ is an integer number, $a_i$, $b_i$, $c_i$ are weight constants of distortion in the appropriate direction and $f_i(x,y,z)$, $g_i(x,y,z)$, $h_i(x,y,z)$ are functions for ensuring achievement of the chosen required image distortion.

9 Claims, 3 Drawing Sheets

OPTICAL SYSTEM FOR DISTORTED IMAGING OF AN OBJECT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention here presented deals with an optical system enabling such an imaging of an object, the result of which is a generally distorted, deformed image of an object.

BACKGROUND OF THE INVENTION

Lenses, or more precisely optical systems currently used in photographic cameras are characteristic by providing perfect image of the taken object with minimum distortion. When photographing an object located within finite distance from a camera lens the co-ordinates of (x,y) of any point are related to the co-ordinates (x', y') of the image of this point by relations $$x'=m_x x,\ y'=m_y y,$$

where $m_x$ and $m_y$ represent magnification in the direction of the co-ordinates and their value is constant for the given distance of the object from the camera lens. The relation is always $m_x=m_y=m$ except for anamorphotic lenses. The relation between an object and its image is thus described as linear transformation. For infinite object distance the size of the image, created by the photographic lens is, defined by the relation $$y'=f.tgw\text{--central projection,}$$

where f is the lens focal length and w is the angle of the lens field of view. For extremely wide-angle lenses of "fish eye" type (2w>180°) the size of image created by such a lens is defined by one of these relations:

$$y'=f.w\text{--equidistant projection}$$

$$y'=2f\sin(w/2)\text{--ortographic projection}$$

$$y'=2f\ tg(w/2)\text{--stereographic projection.}$$

As can be seen from these relations, current photographic lenses only allow such a projection of an object, which is described by one of the above relations. The above, optical systems, or more precisely photographic lenses have a drawback, in that they are not capable of giving a generally distorted image of an object.

BRIEF SUMMARY OF THE INVENTION

The above drawbacks are removed by the optical system for distorted image of an object according to the invention, particularly intended for photographic cameras. It is based on the principle a distorting optical system consisting of one or more lenses where at least one of the lenses has at least one asymmetrical aspherical optical surface and/or of one or more diffractive elements, where at least one diffractive element has a surface with asymmetric diffractive structure and/or at least two lenses with mutual general space orientation. The following relations apply to the orthogonal co-ordinates (x, y, z) of any point of the object whose image is to be distorted, and the orthogonal co-ordinates (x', y', z') of the image of this point with the required distortion:

$$x' = \sum_{i=1}^{i=N} a_i f_i(x, y, z),\quad y' = \sum_{i=1}^{i=N} b_i g_i(x, y, z),\quad z' = \sum_{i=1}^{i=N} c_i h_i(x, y, z)$$

where $N \geq 1$ is an integer number, $a_i$, $b_i$, $c_i$ are weight constants of distortion in the appropriate direction and $f_i(x,y,z)$, $g_i(x,y,z)$, $h_i(x,y,z)$ are functions for ensuring achievement of the chosen required distortion of image.

One of the possible variants is, that the distorting optical system may be located between the first and the second optical systems.

In another version the first optical system is placed before the distorting optical system in the direction from the object the image of which is to be shot.

In another version the second optical system is placed after the distorting optical system in the direction from the object the image of which is to be shot.

The first and/or the second optical system may consist of a centered system of lenses or by a common photographic lens.

In another possible version at least one of the optical elements forming the distorting optical system may be designed as rotary.

Any object located in the space in front of the distorting optical system, or any image of an object located in the space in front or behind the distorting optical system, created by another optical system, may be the object the image of which is to be distorted.

An optical system setup this way has the advantage that it enables such an image of an object, the result of which is a generally distorted, deformed image of the object. The distortion size and character may be changed anyhow according to the user's intention by changes of weight constants and functions.

BRIEF DESCRIPTION OF THE SEVERAL VIEWS OF THE DRAWINGS

The optical system according to the invention will be then described in more detail on the enclosed drawings.

DETAILED DESCRIPTION OF THE INVENTION

Figure 1:
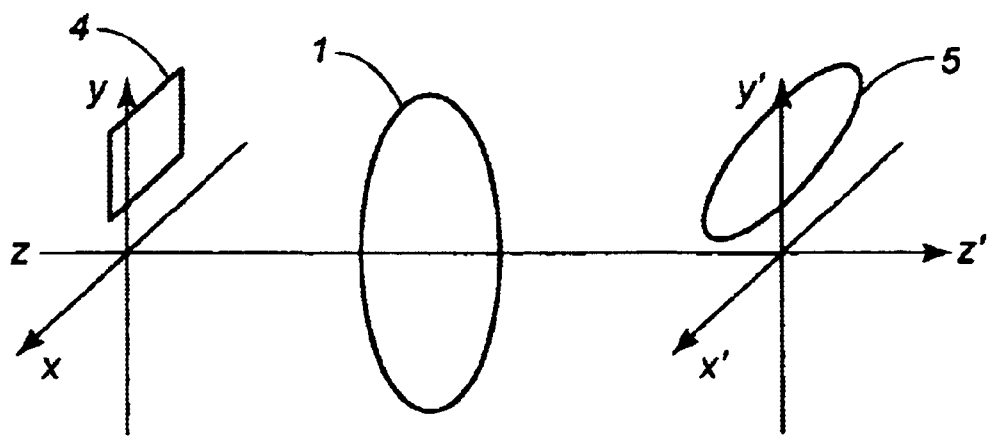
FIG. 1 shows a schematic view of the simplest version of the optical system with indication of its function.

The optical system for distorted projection of an object, especially for photographic cameras is presented in its simplest schematic form in FIG. 1. It consists of a distorting optical system 1, which is not drawn in detail here. This distorting optical system 1 may be realized in numerous ways with optical elements using refraction, reflection and diffraction of light or a combination of the above elements. It may consist of one or more lenses of which at least one has at least one asymmetric aspherical optical surface. It may be also created by one or more diffractive elements, where at least one diffractive element has a surface with asymmetric diffractive structure. There is also a possibility for this distortion optical system 1 to be made of at least two lenses with mutual general space orientation. These possibilities presented here may be combined anyhow depending on the required distortion of the image 5 of the object 4. The following relations apply to the orthogonal co-ordinates (x, y, z) of any point of the object 4 whose image 5 is to be distorted, and the orthogonal co-ordinates (x', y', z') of the image 5 of this point with the required distortion:

$$x' = \sum_{i=1}^{i=N} a_i f_i(x, y, z), \quad y' = \sum_{i=1}^{i=N} b_i g_i(x, y, z), \quad z' = \sum_{i=1}^{i=N} c_i h_i(x, y, z)$$

where $N \geq 1$ is an integer number, $a_i$, $b_i$, $c_i$ are suitably selected weight constants of distortion in the appropriate direction and $f_i(x,y,z)$, $g_i(x,y,z)$, $h_i(x,y,z)$ are adjustable functions for ensuring achievement of the chosen required image distortion. These functions may have for example the following forms:

$f_1=x$, $f_2=y$, $f_3=z$, $f_4=x \cdot y$, $f_5=x \cdot z$, $f_6=y \cdot z$, $f_7=x^2$, $f_8=y^2$, $f_9=z^2$, $f_{10}=x^2 \cdot y$, $f_{11}=x^2 \cdot z$, $f_{12}=y^2 \cdot x$, $f_{13}=y^2 \cdot z$, $f_{14}=x^3$, $f_{15}=y^3$, $f_{16}=z^3$, etc.

similarly for functions $g_i(x,y,z)$ and $h_i(x,y,z)$.

The optical system is based on the principle that the object 4 of e.g. rectangular shape is projected by the optical system according to the invention as a general curve and so the image 5 is not very similar to the object 4. This is why the optical system according to the invention substantially differs from an ordinary optical system, which would project a rectangle as another rectangle, i.e. an image created by an ordinary optical system is similar to the object as much as possible.

Any object located in the space in front of the distorting optical system 1 or any image of an object, created by another optical system may be the object 4.

Figure 2:
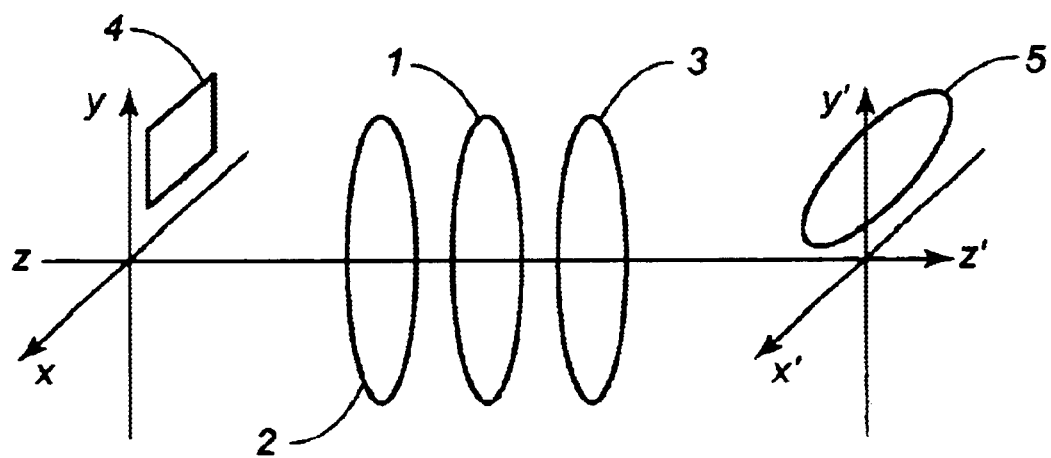
FIG. 2 shows another schematic view of possible positions, in which the distorting optical system may be located.

FIG. 2 shows schemes of possibilities of realization of the optical system as a whole, which are based on different arrangement of the distorting optical system 1. The first possibility is based on location of the distorting optical system 1 between the first optical system 2 and the second optical system 3. The second possibility is omission of the first system 2 and leaving just the distorting optical system 1 and the second optical system 3 located after it in the direction from the shot object 4. On the other side it is also possible to omit the second optical system 3 and leave just the distorting optical system 1 and the first optical system 2 located before it in the direction from the shot object 4. The fourth possibility actually corresponds with the arrangement of FIG. 1, where both, the first and the second optical systems 2 and 3 are omitted and only the distorting optical system 1 is left.

Figure 3:
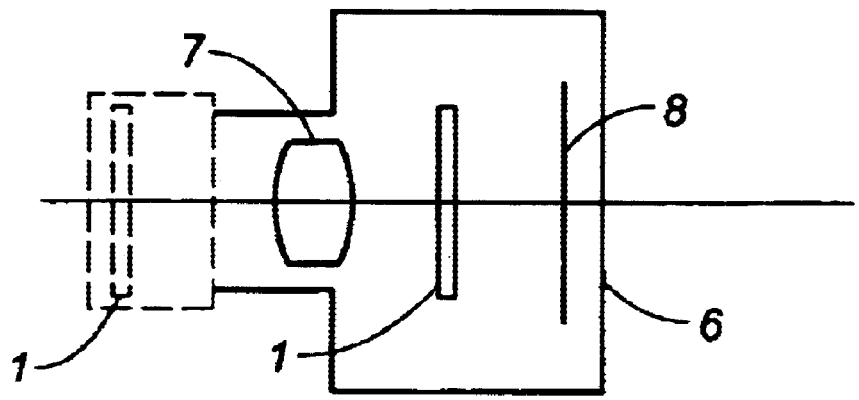
FIG. 3 is a schematic view showing examples of location of the distorting optical system in a photographic camera.

FIG. 3 shows two possible ways of arrangement of the optical system according to the invention in connection with a common commercially manufactured photographic camera. There are positions of a photographic lens 7 and a film 8 in a body of a camera 6. The distorting optical system 1 may be built inside the camera after the photographic lens 7, or may be mounted before the photographic lens 7 e.g. as a removable supplementary lens, as drawn in broken line.

Figure 4:
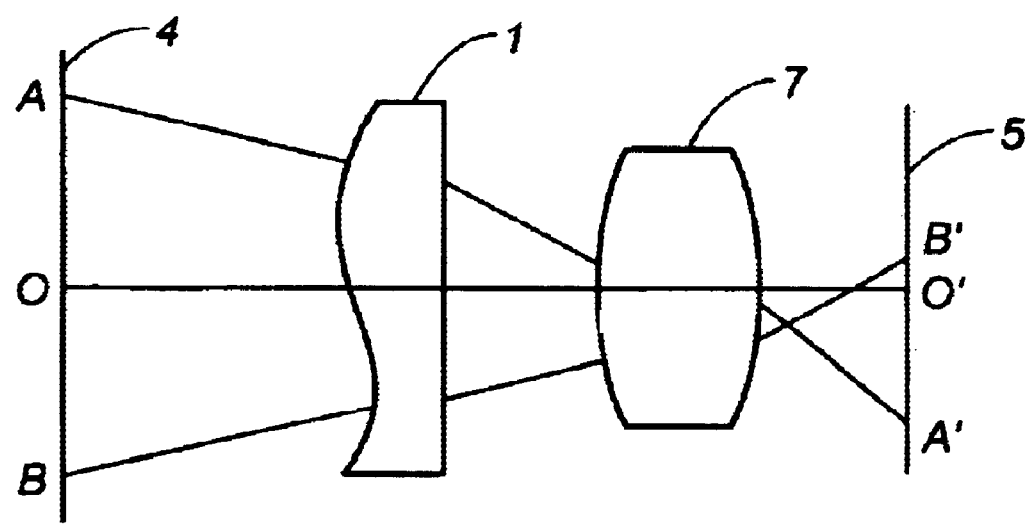
FIGS. 4–6 are schematic views showing possible versions of simple arrangements of the optical system according to the invention.

As mentioned above, the distorting optical system 1 may consist of one or more lenses with asymmetrical aspherical surfaces, of elements of suitable forms using refraction, reflection and diffraction of light, like diffractive elements with asymmetric diffractive structure, of a system of lenses with mutually general orientation in the space or of a combination of all these possibilities. The first optical system 2 and the second optical system 3, which are located before or after the distorting optical system 1 may consist of for example a centered system of lenses or of an ordinary photographic lens 7. FIG. 4 shows a scheme of arrangement of one of the above versions, namely the version with the distorting optical system 1 located in front of the photographic lens 7. If two points A and B are chosen on the object 4 equidistant from the point O, then the images A' a B' of these points will appear at different distances from the point O' and thus the image 5 of the object 4 will be distorted. In this instance the optical element forming the distorting optical system 1 consists of rotationally asymmetric aspherical lens located before the photographic lens 7, so as the asymmetric lens is turned, in this case around the axe of the photographic lens 7, and thus various distortion of the shot object 4 in dependence on the angle of its rotation is created. The distorting optical system 1 will have the same effect if located after the photographic lens 7.

Figure 5:
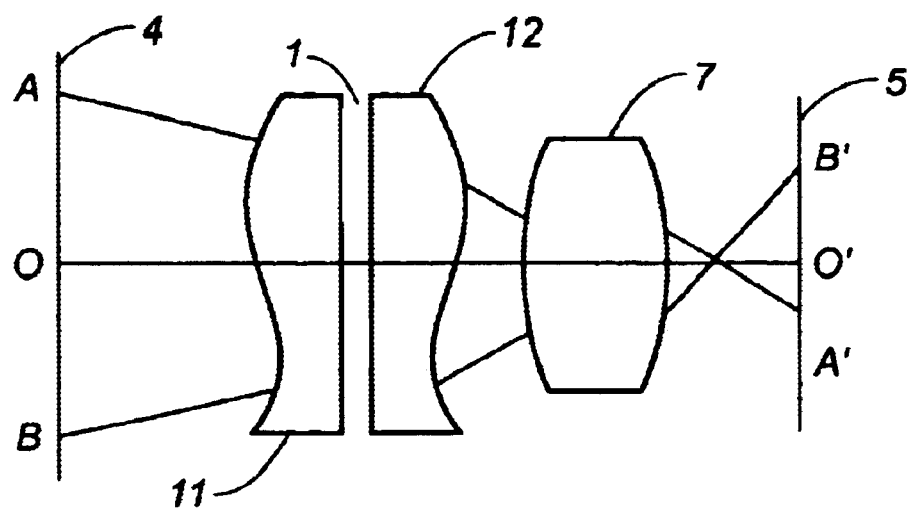
Figure 6:
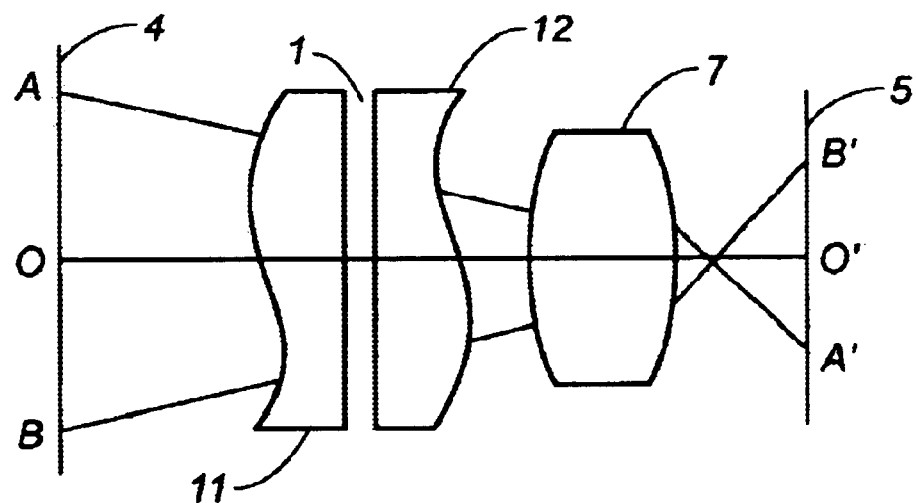

FIG. 5 shows another variation, where the distorting optical system 1 consists of the first and second aspherical lenses 11 and 12. These aspherical lenses 11 and 12 may rotate around the axe O–O'. The distorting effect is the strongest in the position shown in FIG. 5. In the position shown in FIG. 6 there is zero distorting effect and the system works as a normal photographic lens, where the retractivity of the distorting optical system 1 is constant in this position of its elements. The same effect may be achieved by locating the two-element distorting optical system 1 after the photographic lens 7.

The presented optical system solution may be used wherever a distorted image of a photographed object is required, i.e. in the field of photographic, reprographic and projection technology etc.

We claim:

1. An optical system for distorted imaging of an object, especially for photographic cameras, said optical system comprising: at least one lens, where at least one lens has at least one asymmetric aspherical optical surface and/or at least one diffractive element, where at least one diffractive element has a surface with asymmetric diffractive structure and/or at least two lenses in mutually general orientation in space, while the following relations apply to orthogonal co-ordinates (x, y, z) of any point of an object whose image is to be distorted, and the orthogonal co-ordinates (x', y', z') of the image of this point with the required distortion:

$$x' = \sum_{i=1}^{i=N} a_i f_i(x, y, z), \quad y' = \sum_{i=1}^{i=N} b_i g_i(x, y, z), \quad z' = \sum_{i=1}^{i=N} c_i h_i(x, y, z)$$

where $N \geq 1$ is an integer number, $a_i$, $b_i$, $c_i$ are weight constants of distortion in the appropriate direction and $f_i(x,y,z)$, $g_i(x,y,z)$, $h_i(x,y,z)$ are functions for ensuring achievement of the chosen required image distortion.

2. An optical system according to claim 1, wherein the distorting optical system is located between the first optical system and the second optical system.

3. An optical system according to claim 1, wherein the first optical system is placed before the distorting optical system in the direction from the object the image of which is to be shot.

4. An optical system according to claim 1, wherein the second optical system is placed after the distorting optical system in the direction from the object the image of which is to be shot.

5. An optical system according to claim 2, wherein the first optical system and/or the second optical system are comprised of a centered system of lenses.

6. An optical system according to claim 2 wherein the first optical system and/or the second optical system is comprised of an ordinary photographic lens.

7. An optical system according to claim 1, further comprising at least one of the optical elements forming the distorting optical system designed as rotary.

8. An optical system according to claim 1 wherein any object located in the space in front of the distorting optical system, is the object the image of which is to be distorted.

9. An optical system according to claim 1, wherein any image of an object located in the space in front or behind the distorting optical system, created by another optical system, may be the object the image of which is to be distorted.

* * * * *